Feb. 25, 1958 J. P. MOLNAR 2,824,998

MAGNETRONS

Filed April 13, 1953

INVENTOR
J. P. MOLNAR
BY James W. Falk
ATTORNEY

United States Patent Office 2,824,998

Patented Feb. 25, 1958

2,824,998

MAGNETRONS

Julius P. Molnar, Summit, N. J., assignor to Bell Telephone Laboratories, Incorporated, New York, N. Y., a corporation of New York Application April 13, 1953, Serial No. 348,218

7 Claims. (Cl. 315—39)

This invention relates to magnetrons and more particularly to the cancellation of the variations with frequency of the reactance introduced by the transformer output in tunable magnetrons.

In certain types of magnetrons, such as described in application Serial No. 96,963, filed June 3, 1949, of M. S. Glass and Patent 2,657,334, issued October 27, 1953, of J. W. West, the operating frequency of the magnetron is varied by introducing tuning pins into each of the resonator bores of the magnetron. These tuning pins have in the past been all of the same dimensions to achieve equal tuning of each resonator bore. However, due to the presence of the output path, which may advantageously be a wave guide coupled to one resonator bore through a multisection impedance transformer, a variable reactance is introduced into the resonant circuit of the magnetron as the operating frequency is varied. This frequency variable reactance results from the variation in the inductance of the transformer sections with frequency, as reflected back into the resonant circuit, and may adversely affect the tube. Particularly this variation may impair the attainment of equal loading of the doublet components of a mode of oscillation other than the main or $\pi$-mode.

In an application Serial No. 348,438, filed April 13, 1953, now Patent 2,796,362, issued June 25, 1957, of R. C. Fletcher and S. Millman there is described a novel magnetron resonator structure wherein "moding" is prevented by assuring that the doublet components of the mode of oscillation to be suppressed, which is advantageously the mode closest in frequency to the main or $\pi$-mode, are equally loaded. "Moding," as described further in the Fletcher-Millman application, occurs when a magnetron oscillates in other than the desired mode so that no line appears in the slot assigned to that particular pulse in the spectrum of the main mode. It has been found, however, that the frequency variable transformer reactance prevents the loading of the doublet components from being substantially equal over the entire tuning range.

It is an object of this invention to compensate for the frequency variable reactance introduced by the output impedance transformer coupled to the resonant circuit of a tunable magnetron.

It is another object of this invention further to inhibit the build up of oscillation in an undesired mode by assuring that the doublet components of that mode are loaded equally within tolerable limits over the entire tuning range.

It is a further and general object of this invention to provide an improved magnetron.

These and various other objects of this invention are attained in specific embodiments of this invention by increasing the diameter of the tuning pin insertable into the resonator bore or cavity resonator through which the output energy is removed.

In one specific embodiment, the output resonator is enlarged to provide clearance for a single enlarged tuning pin and the impedance transformer associated therewith is constructed so that the net reactance of the enlarged output resonator and the transformer is balanced with the reactances of the other resonators of the resonant circuit. This may advantageously be done by reducing the length of the impedance transformer so that it is shorter than would be employed in a balanced cavity resonator circuit. However, in other specific embodiments where the clearances between the tuning pins and the resonator bore walls is sufficient, the tuning pins in both the output resonator and the resonator directly opposite thereto may be enlarged. If the compensation for the frequency variations of the impedance transformer reactance is attained by enlarging the diameter of these two tuning pins, then the difference in diameter between the enlarged pins and the other pins need not be as great as when only one of these pins is enlarged. Reference is made to an application Serial No. 348,526, filed April 13, 1953, of M. S. Glass and L. R. Walker for a further discussion of the use of reactances 180° apart in a resonant circuit to augment each other's effect.

It is therefore a feature of this invention that the tuning pin insertable into the cavity resonator of a resonant circuit by which energy is transferred from that circuit be of larger diameter than the tuning pins insertable into the other cavity resonator to compensate for the variations with frequency of the reactance introduced to the resonant circuit by the energy transfer means coupled to the output resonator.

It is further a feature of one specific embodiment of this invention that the output resonator be of larger diameter than the general resonators of the resonant circuit to accommodate an enlarged tuning pin and that an impedance transformer wave guide section associated therewith be of reduced length so that the combined reactance of the transformer section and the output cavity resonator presented to the resonant circuit be balanced with the reactances of the other cavity resonators.

These and various other features of this invention may be understood from consideration of the following detailed description and the accompanying drawing, in which.

Figures 1, 2, 3:
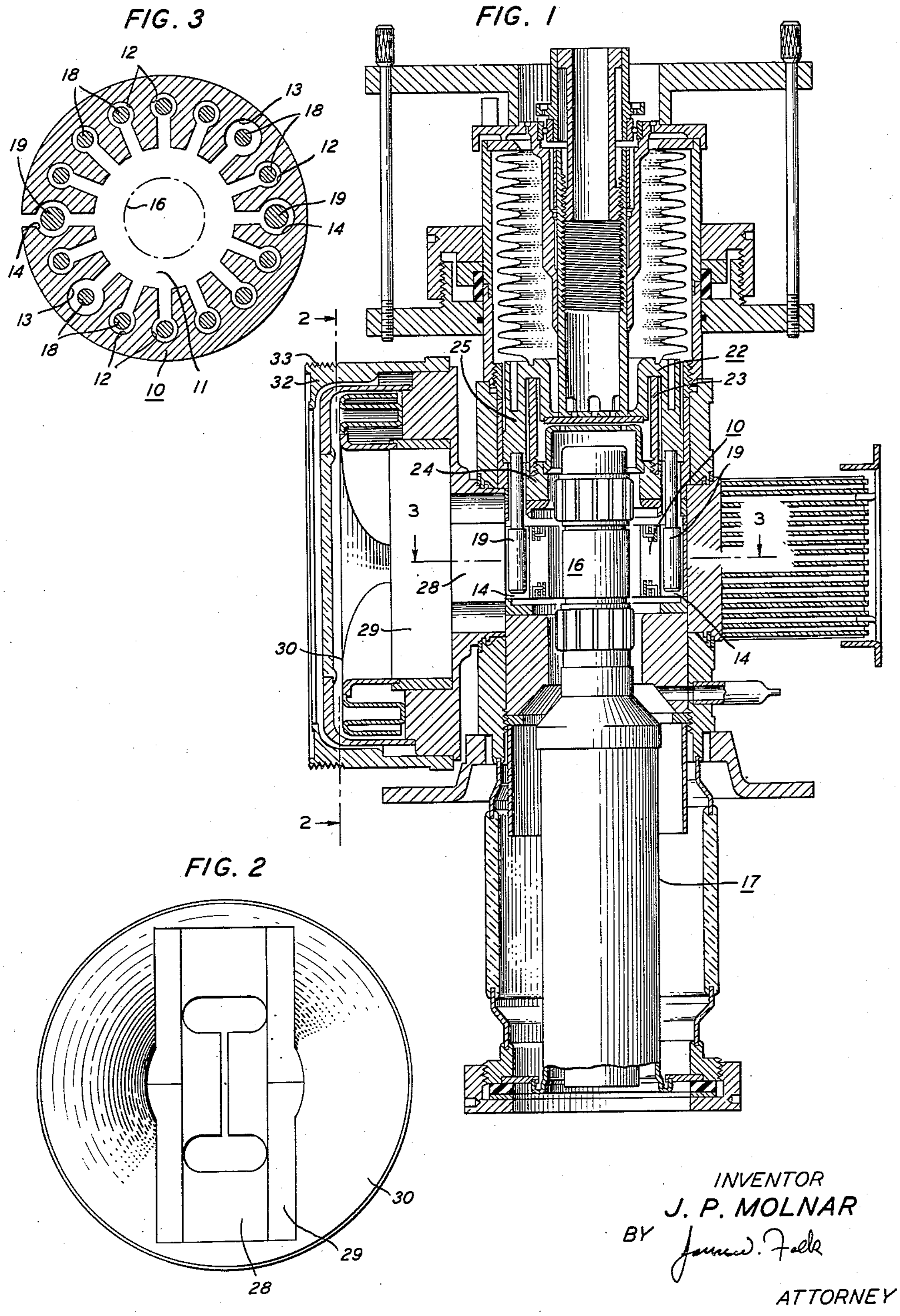
Fig. 1 is a sectional view of a magnetron in which this invention may be incorporated.
Fig. 2 is a plan view of the output transformer wave guide section of the embodiment of Fig. 1 along the line 2—2 thereof.
Fig. 3 is a sectional view of the anode and tuning pins of the embodiment of Fig. 1 along the line 3—3 of Fig. 1.

Turning now to the drawing, the magnetron therein illustrated is of the type fully described in Patent 2,657,334, issued October 27, 1953, of J. W. West, and comprises an anode 10 having an axial aperture 11 and a plurality of cavity resonator bores 12, 13 and 14, further described below, equally spaced in a circuit array around the aperture 11 and communicating therewith. A cathode 16 comprising a cylindrical sleeve having an electron emissive coating thereon is positioned within the axial aperture 11 and supported by the supporting cylinder 17. Tuning pins 18 and 19 in accordance with this invention, as further described below and best seen in Fig. 3, are insertable into the cavity resonator bores 12, 13 and 14 by a tuning mechanism 22. A cylindrical tuning choke 23 is mounted by the pole piece 24 and cooperated with the tuning pin carrier member 25 to prevent power loss into the tuning head resonators, as more fully described in the above-mentioned West patent.

Energy from the magnetron is advantageously transmitted from the output resonator bore 14 through a wave guide system comprising a first H-section or dumbbell shaped transformer 28, a second transformer 29, and matching transformer member 30, the outer dimensions of which match the dimensions of the external wave guide which may be attached to a metallic coupling member 32 as by the threaded portion 33. Advantageously, the output transformer, as seen clearly in Fig. 2, comprises these distinct steps between the dimensions of the output wave guide section through the anode 10, i. e., the slot of the H-section 28, and the external wave guide to reduce the reactance variations of the transformer with frequency. Further, the reactance of the output transformer and the reactance of the enlarged cavity resonator bore or bores 14 are so proportioned as together to present to the resonant circuit of the magnetron the same reactance as the other cavity resonators. This is advantageously attained by shortening the length of each of the steps of the impedance transformer, i. e., the length of the H-section 28, the intermediate section 29, and the matching section 30, as either of the cavity resonators 14 or both are enlarged. The particular length of the transformer will of course depend on the impedances involved and the enlargement of the cavity resonators 14. Advantageously, the transformer is of such dimensions as to introduce little or no reactance at the lowest frequency of the main mode of oscillation and has sufficiently broad band characteristics so that the reactance increases only slowly with frequency.

Turning now to Fig. 3 there is there shown a sectional view of the anode 10 of the specific illustrative embodiment of the invention depicted in Fig. 1. In this embodiment the cavity resonators 12 are all equally dimensioned, as has been the practice of the art. Two of the cavity resonators 13, however, are of different diameter than the resonators 12, being shown enlarged an exaggerated amount for purposes of clarity. These resonators 13 are positioned from the output resonator 14 a specified angular distance more nearly to equalize the loading of the doublet components of the mode of oscillation of the magnetron closest to the $\pi$-mode and thus prevent moding, as more fully described in the above-mentioned Fletcher-Millman application.

The output resonator bore 14 and the bore 14 opposite thereto are also larger than the cavity resonator bores 12 in order to accommodate an enlarged diameter tuning pin 19, in accordance with this invention; resonator bores 14 are also shown enlarged an exaggerated amount for purposes of clarity. By providing that the tuning pin insertable into the output cavity resonator be of larger diameter than the other tuning pins, the variations due to frequency of the reactance of the output transformer can be compensated for and substantially equal loading of the doublet components of the mode it is desired to suppress attained over the entire frequency range of operation. The inductance introduced by the output transformer increases as the frequency of operation is increased, while the inductance of each cavity resonator is decreased by the insertion of the tuning pins. In accordance with this invention by utilizing an enlarged tuning pin 19 in the output cavity resonator, the inductance of the output cavity resonator decreases at a faster rate than the inductance of the other cavity resonator. The net change of reactance with frequency presented to the resonant circuit by these resonators is thereby balanced with the change of reactance of the other cavity resonators.

An appreciation of the difference in size of the tuning pins 18 and 19 can be gained from one specific illustrative embodiment of this invention wherein tuning pins 18 were .182 inch and tuning pins 19 .202 inch, the respective bores 12 and 14 being .236 and .256 inch. Bores 13 were .260 inch.

Reference is made to application Serial No. 348,365, filed April 13, 1953, now Patent 2,797,361, issued June 25, 1957, of M. S. Glass wherein a related invention is described.

It is to be understood that the above-described arrangements are illustrative of the application of the principles of the invention. Numerous other arrangements may be devised by those skilled in the art without departing from the spirit and scope of the invention.

What is claimed is:

1. A resonant circuit comprising a conductive member defining a plurality of cavity resonators arranged in a circular array, energy transfer means coupled to one of said resonators, said one resonator being larger than the majority of the remainder of said resonators, and a tuning pin insertable into each of said resonators, the majority of said tuning pins being all dimensionally equal but said tuning pin insertable into said enlarged resonator being larger than said dimensionally equal tuning pins.

2. A resonant circuit comprising a conductive member defining a plurality of cavity resonators arranged in a circular array, energy transfer means coupled to one of said resonators, said one resonator being larger than the majority of the remainder of said resonators, and a tuning pin insertable into each of said resonators, said tuning pin insertable into said enlarged resonator being larger than the majority of the remainder of said tuning pins.

3. A magnetron comprising a conductive member defining a plurality of cavity resonators arranged in a circular array, wave guide output means coupled to one of said resonators and a tuning pin insertable into each of said resonators to tune said magnetron, said resonator coupled to said wave guide output means being of larger diameter than the majority of the other of said resonators and said tuning pin insertable into said resonator coupled to said wave guide output means being of larger diameter than the majority of the remainder of said tuning pins to compensate for the variations with frequency of the reactance of said wave guide output means.

4. A magnetron comprising a conductive member having a central aperture and a plurality of cavity resonators therein, said resonators being arranged in a circle around said aperture and each communicating therewith, a cathode in said aperture, wave guide output means coupled to one of said resonators, said one resonator being of larger diameter than the majority of the other of said resonators and said wave guide output means including impedance transformer means, said enlarged resonator diameter and the length of said impedance transformer means being codetermined to balance the reactance presented by said enlarged resonator to said magnetron with the reactances of said other resonators, and a tuning pin insertable into each of said resonators, said tuning pin insertable into said resonators coupled to said output means being of larger dimension than the majority of the remainder of said tuning pins to compensate for the variations of frequency of the output means.

5. A magnetron in accordance with claim 4 wherein an enlarged tuning pin is inserted into that cavity resonator which is substantially 180 degrees removed from said resonator coupled to said output wave guide means.

6. A magnetron comprising a conductive member having a central aperture and a plurality of cavity resonator therethrough, said resonators each communicating with said central aperture and being arranged in a circle therearound, a cathode in said central aperture, wave guide means for removing energy from one of said resonators, said wave guide means comprising impedance transformer means, and a tuning pin insertable into each of said resonators, the majority of said tuning pins being all dimensionally equal but said tuning pin insertable into said one resonator being of larger diameter than the remainder of said tuning pins.

7. A magnetron in accordance with claim 6 wherein said resonator into which said enlarged tuning pin is insertable is itself of larger diameter than the majority of the remainder of said resonators.

References Cited in the file of this patent

UNITED STATES PATENTS

| | | |
|---|---|---|
| 2,449,794 | Steele | Sept. 21, 1948 |
| 2,653,276 | Crawford | Sept. 22, 1953 |